US006988050B2

(12) United States Patent
Slanec

(10) Patent No.: US 6,988,050 B2
(45) Date of Patent: Jan. 17, 2006

(54) SETTING DEVICE FOR A VEHICLE HAVING A MECHANICALLY ADJUSTABLE PART, AND METHOD FOR OPERATING THE SETTING DEVICE

(75) Inventor: Konrad Slanec, St. Julians (MT)

(73) Assignee: Methode Electronics Malta Ltd., Mriehel (MT)

( * ) Notice: Subject to any disclaimer, the term of this patent is extended or adjusted under 35 U.S.C. 154(b) by 0 days.

(21) Appl. No.: 10/149,421

(22) PCT Filed: Oct. 22, 2001

(86) PCT No.: PCT/IB01/01972

§ 371 (c)(1), (2), (4) Date: Oct. 22, 2002

(87) PCT Pub. No.: WO02/35073

PCT Pub. Date: May 2, 2002

(65) Prior Publication Data

US 2003/0075891 A1 Apr. 24, 2003

(30) Foreign Application Priority Data

Oct. 23, 2000 (DE) ................................ 100 52 442

(51) Int. Cl.

| | |
|---|---|
| ***G01C 17/00*** | (2006.01) |
| ***G01B 15/00*** | (2006.01) |
| ***G06F 19/00*** | (2006.01) |
| ***G05F 1/14*** | (2006.01) |

(52) U.S. Cl. ........................ 702/155; 702/150; 701/70; 74/513

(58) Field of Classification Search ................ 702/150, 702/155, 151, 57; 701/29, 70, 36; 74/512, 74/513

See application file for complete search history.

(56) References Cited

U.S. PATENT DOCUMENTS

| | | | | |
|---|---|---|---|---|
| 5,088,461 | A | 2/1992 | Ohashi et al. | 123/399 |
| 5,229,957 | A * | 7/1993 | Hahn et al. | 702/94 |
| 5,241,936 | A * | 9/1993 | Byler et al. | 123/399 |
| 6,295,501 | B1 | 9/2001 | Funcke et al. | 701/110 |
| 6,421,589 | B1 * | 7/2002 | Bederna et al. | 701/29 |

FOREIGN PATENT DOCUMENTS

| | | |
|---|---|---|
| DE | 198 28 533 | 1/2000 |

* cited by examiner

*Primary Examiner*—John Barlow
*Assistant Examiner*—Meagan S Walling
(74) *Attorney, Agent, or Firm*—Jacobson Holman PLLC

(57) ABSTRACT

A setting device for a vehicle having a mechanically adjustable part in which a sensor assigned to the mechanically adjustable part generates sensor signals corresponding to the positions of the part. An initial range of the sensor values is assigned to an inoperative position of the part and covers the varying initial positions of the part. An evaluation device stores a longer constant signal in the initial range as an intermediate value. A longer constant sensor signal is compared with the intermediate value after the initial range is exceeded and after the subsequent return into this range. If it is established that both values are approximately of the same magnitude, the evaluation device stores this value as an initial value. As a result, the inoperative position of the part is reliably verified without the use of additional auxiliary components or steps.

6 Claims, 1 Drawing Sheet

SETTING DEVICE FOR A VEHICLE HAVING A MECHANICALLY ADJUSTABLE PART, AND METHOD FOR OPERATING THE SETTING DEVICE

This is a nationalization of PCT/IB01/01972, filed Oct. 22, 2001 and published in German.

BACKGROUND OF THE INVENTION

1. Field of the Invention

The invention relates to a setting device for a motor vehicle with a mechanically adjustable component and a process for operating the setting device.

2. Description of the Related Art

It is typical in automobiles to couple a setting element, designed, for example, as a foot lever, with a sensor, which detects the angular position of the lever. The position signal of the lever is adjusted after installation into the automobile, in that in a stop position of the foot lever an auxiliary signal is set by way of an external signal input, or in that the position of the sensor itself is adjusted mechanically. The signal level, pending at the sensor in this instant, is then stored as the output signal and subtracted or compared in a subsequent operation. The reliability of the process can hardly be guaranteed according to automobile aspects. It is possible during subsequent operation of the motor vehicle that the geometry of the lever unit changes, for example, due to increasing bearing play, by means of deformations or in the event of a repair. Even the sensor, designed, for example, as a rotary potentiometer or Hall sensor, can change its characteristics through wear and contamination, for example, with ice particles. The properties of the electronic components will also vary in operation due to aging and environmental influences, a factor that can result automatically in a signal drift.

Conventional adaptive learning systems cannot be applied here, since the actuating profiles of the signals are a function of both the driver and the traffic situation, such as an uncontrolled long dwell period in a specific position. Furthermore, known algorithms cannot measure the short-term zero point changes, such as those that occur, for example, after a repair.

The DE 3612904 A discloses a process for the tolerance compensation of a position sensor signal, wherein the neutral position of the component is monitored during the operation of the motor vehicle. In this respect the measured values of an upper or a bottom stop are stored. Should one of these end values be exceeded during operation, the new measured value is stored as the new end value. This feature has the drawback that an actual drift of the neutral position toward the medium range cannot be detected at all.

The invention is based on the problem of eliminating the adjustment cost and increasing the functional reliability.

SUMMARY OF THE INVENTION

This problem is solved by means of the setting device for a motor vehicle in accordance with the present invention, the setting device including a mechanically adjustable component and a sensor which measures the positions of the component and which is connected to an electronic evaluating unit. A neutral position of the component can be defined as the starting position, where the values of the sensor signals that correspond to the neutral position can be stored in the evaluating unit as the initial value, where the neutral position of the component can be monitored as the motor vehicle is operating, and where as the sensor signals deviate significantly in the neutral position from the initial value, the value of the current sensor signals can be stored as the new initial value. According to the present invention, the evaluating unit recognizes a setting cycle, and can store a prolonged stationary dwell position of the component in an initial range of the neutral position. In addition, the departure from the initial range and the approximately exact return into the stored stationary dwell position and the prolonged dwelling therein can be stored as the actual neutral position. Owing to the constant monitoring of the neutral position during operation, shifts of the signal level in the stop position can be detected and corrected. A subsequent adjustment by expert personnel is no longer necessary. A special advantage lies in the fact that fewer requirements have to be imposed on the stability, quality and assembly of the setting device in order to guarantee its function.

A shift in the neutral value can be recognized reliably in both directions. Owing to the principle of repeating an initial value in a prolonged dwell position, it is possible to verify the neutral position with high certainty. It is also conceivable to fix the starting position at the instant that the vehicle electronics is switched on. If, however, at this instant, for example, the clutch pedal was actuated, the result is a misinterpretation with a corresponding malfunction of the operating system. In addition, the signal displacements would not be detectable in operation due to temperature variations. Since it is almost impossible to hit and hold a free floating position precisely multiple times in succession, it can be assumed with high certainty that at least a single repetition of a holding position within an initial range of the sensor signals represents the actual starting position. Thus, by means of this scheme the starting position is, in fact, detected dynamically, but not affected by vibrations, which occur, for example, in automobiles.

Advantageous embodiments of the invention include design of the component as an operating element with the sensor and at least parts of the evaluating unit being combined into a common module connected to a housing of the operating element. By means of this further development, the setting device can be prepared and installed as a largely autonomous system without the need for any further tuning measures.

The operating element may further be provided with a resetting device which, upon release of the operating element, moves it into the starting position. Such a resetting device guarantees in a simple manner the neutral position.

The operating element may also be designed as a spring-loaded swing lever, in particular as a foot lever, with the sensor being designed as an inductive distance sensor for detecting the angular positions of the swing lever. This further development provides an operating device, which can be produced easily with high functional reliability and can be installed into an automobile. A coil of the inductive sensor can be fastened, for example, to a pedal housing; and a metal part, grasped by the coil, can be fastened to a foot lever. Related control electronics are also fastened to the pedal housing and combined with the coil to form a module, which can also contain the evaluating electronics. The inductive sensor detects the distance to the metal part and thus also the angular position of the foot lever.

The present invention further includes a process for operating a setting device in which the position of a mechanical component is detected by a sensor coupled to an electronic evaluating unit. The method includes the steps of assigning a threshold value to sensor signals to determine a starting position of the component, storing the threshold value and an initial sensor signal value corresponding to the starting position in the evaluating unit, and assigning the sensor signals having values below the threshold value to an initial range which corresponds to an allowable range of the component starting position. The process continues by defining an operating cycle by points at which the sensor values exceed the threshold value and subsequently return into the initial range, and detecting a signal level of the sensor continuously or in narrow time intervals and comparing the signal level with the threshold value. A sensor signal value which is below the threshold value and which is constant over a minimum time duration is recognized as an intermediate value and stored. The signal level with the intermediate value is compared with the initial value upon the sensor signal value exceeding and then dropping below the threshold value and, in response to the sensor signal deviating from the initial value and remaining constant at the intermediate value over the minimum time duration, the sensor signal is stored as a new initial value. The setting device may be operable within an automobile, and the starting position of the component may be monitored during operation of the automobile and redefined upon adequate deviation.

In determining the initial value, the degree of verification can be increased even more, when, after another repetition of the exact neutral level, the output signal is recognized and stored. Such a multiple repetition follows, for example, upon actuation of the clutch pedal in a starting phase.

BRIEF DESCRIPTION OF THE DRAWINGS

One embodiment of the invention is depicted in the drawing and is explained below in detail.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
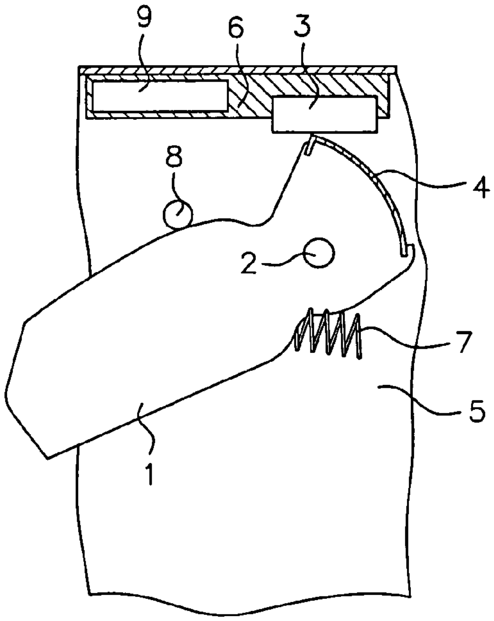
FIG. 1 is schematic drawing of a partial side view of a pedal arrangement of an automobile with a distance sensor in a starting position.

According to FIG. 1, a mechanically adjustable component in the form of a foot lever 1, serving as an operating element, is disposed in a housing 5 so as to pivot about a pedal axis 2. Said housing can be installed into the foot space of an automobile. Above the foot lever 1 there is a stationarily mounted coil element 3, which induces an electromagnetic alternating field aimed in the direction of the foot lever 1. The coil element 3 is a part of a module 6, which is fastened to the housing and which is fastened to the housing 5 and which contains a control and evaluating electronic unit for the coil element.

Fastened to the foot lever 1, which is made, for example, of glass fiber reinforced plastic, there is a metal part 4, which together with the coil element forms an inductive sensor and whose distance to the coil element 3 changes as a function of the tilt position of the foot lever 1. This brings about a corresponding change in the inductive resistance of the coil element 3, a factor that results in a corresponding change in the measurable lost power of the coil element 3. The metal part 4, which is made of bent sheet metal, exhibits a convex cam-like curvature, whose contour is shaped in such a manner that the output signals of the sensor vary approximately in proportion to the angular position of the foot lever 1.

The metal part exhibits a flectional contour, which is easy to produce, and can be connected to the foot pedal with little effort by inserting into a casting mold for the foot lever. Therefore, this part of the sensor incurs almost no additional cost when subsequently installed into the pedal space. In the illustrated starting position, the foot lever rests against a stop 8 of the housing 5 against the force of a reset spring 7 and, in so doing, assumes a neutral position, whose sensor value represents a corresponding initial value. One end of the metal part is closely adjacent to the coil element and has a correspondingly strong impact on its electromagnetic alternating field.

Figure 2:
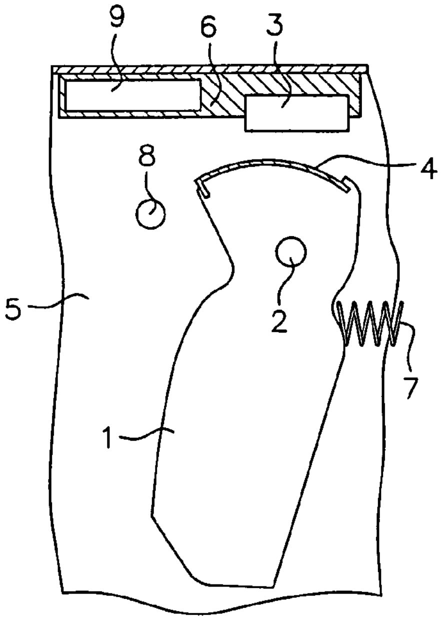
FIG. 2 depicts the parts, according to FIG. 1, in another functional position.

According to FIG. 2, the foot lever swings into a functional position, in which the distance to the coil element 3 is significantly enlarged. The inductive resistance of the coil element has changed correspondingly. In a directly coupled converter (not illustrated) the sensor values can be converted into output signals and can be processed in an electronic evaluating unit of the module 6.

Figure 3:
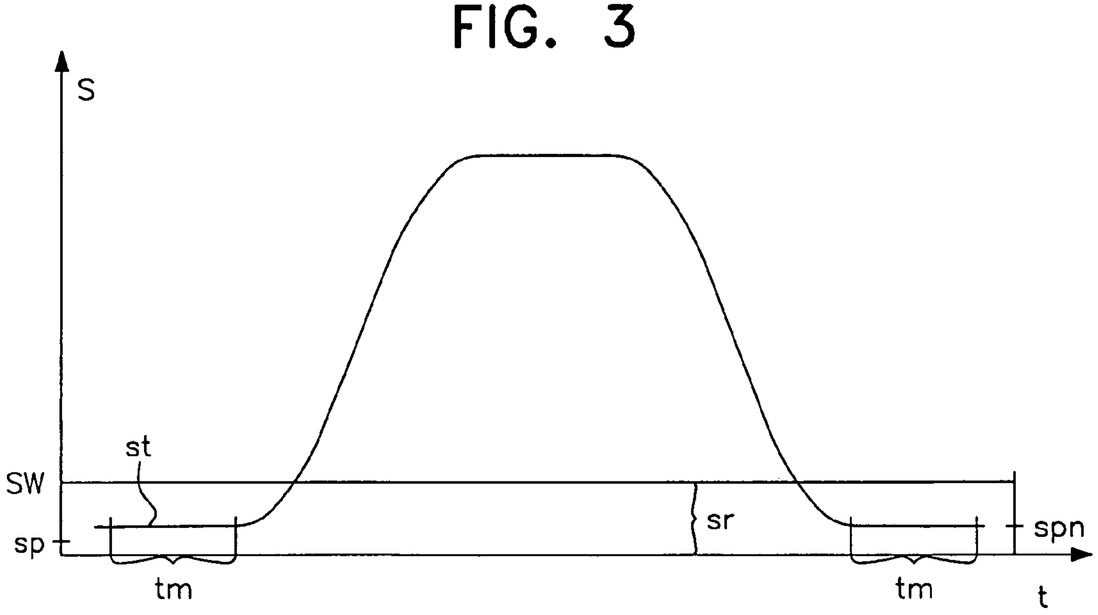
FIG. 3 is a curve diagram of the sensor values as the position of the pedal arrangement, according to FIG. 1, changes.

FIG. 3 reproduces the curve of the sensor values during one operating cycle, where t denotes the one time axis and s the axis of the sensor values. A threshold value sw, which is stored in the evaluating unit 9 (FIG. 1), defines an initial range sr of the sensor values, within which the initial value can vary. A past initial value sp is stored in the evaluating unit. On the left hand side of the curve the foot lever is in the stop position, according to FIG. 1. The sensor value s lies here significantly above the stored past initial value sp. Since the setting device, provided with a time element, does not exhibit any additional sensor, for example, in the form of an end probe for detecting the stop position, it assumes in the sensor value, which is constant over a defined minimum duration tm, below the threshold value sw a new initial value, which it stores as the temporary intermediate value st.

In the subsequent phase the foot lever 1 is swung out of its starting position into the functional position, shown in FIG. 2, where the sensor values s clearly exceed the threshold value sw. After the foot lever has returned into the starting position, shown in FIG. 1, the sensor values s reach in the right hand side of the curve exactly the amount of the intermediate value st, which remains constant over the specified minimum duration tm. The evaluating unit 9 compares this value with the intermediate value st. Upon adequate agreement between the two values and significant deviation from the stored initial value sp, the evaluating unit stores the intermediate value st as the new initial value spn for the neutral position of the foot lever 1 (FIG. 1).

Such a setting device and such an adjustment procedure can be applied not only to operating elements of a motor vehicle, but also to other setting and drive devices with cyclic sequences, for example in a carburetor or an injection system. The verification of the neutral position through exact repetition renders additional evaluations, for example, of probe positions or the current pickup of control drives superfluous. A special advantage lies in the fact that the device can work with the related sensor totally independent of other variables, a factor that makes it possible to largely separate the different measurement and control devices of the motor vehicle.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A setting device for a motor vehicle with a mechanically adjustable component, said setting device comprising:

a sensor that measures positions of the component, with a neutral position of the component being defined as a starting position;

said component designed as an operating element provided with a reset device which, upon release of said operating element, moves said operating element into said starting position; and an electronic evaluating unit, connected to said sensor and receiving sensor signals, a sensor signal value that corresponds to the neutral position being stored in said electronic evaluating unit as an initial value, the neutral position of the component being monitored as the motor vehicle is operating and, when the sensor signals deviate significantly in the neutral position from the initial value, a current sensor signal value being stored as a new initial value;

said evaluating unit recognizing a setting cycle and storing a prolonged stationary dwell position of the operating element in an initial range of the neutral position and storing a departure from the initial range, and an approximately exact return into the stored stationary dwell position and the prolonged dwelling therein, as the actual neutral position.

2. The setting device, as claimed in claim 1, wherein the operating element and the sensor and at least parts of the evaluating unit are combined into a common module and are connected to a housing for the operating element.

3. The setting device, as claimed in claim 1, wherein the operating element is designed as a spring-loaded swing lever, and the sensor, designed as an inductive distance sensor, detects angular positions of said swing lever.

4. The setting device, as claimed in claim 3, wherein the operating element is a foot lever.

5. A process for operating a setting device in which the position of a mechanical operating element is detected by a sensor coupled to an electronic evaluating unit, the method comprising the steps of:

assigning a threshold value to sensor signals to determine a starting position of the operating element, said operating element having a reset device;

storing said threshold value and an initial sensor signal value corresponding to said starting position in the evaluating unit;

assigning the sensor signals having values below the threshold value to an initial range which corresponds to an allowable range of said component starting position;

defining an operating cycle by points at which the sensor values exceed the threshold value and subsequently return into the initial range;

detecting, by said evaluating unit, a signal level of the sensor continuously or in narrow time intervals and comparing the signal level with the threshold value;

recognizing a sensor signal value which is below the threshold value and which is constant over a minimum time duration, as an intermediate value and storing said intermediate value;

comparing the signal level with the intermediate value and the initial value upon the sensor signal value exceeding and then dropping below the threshold value;

storing, in response to the sensor signal deviating from the initial value and remaining constant at the intermediate value over the minimum time duration, the sensor signal as a new initial value; and said reset device moving said operating element into said starting position upon release of said operating element.

6. The process as claimed in claim 5, wherein the setting device is operable within an automobile, and the starting position of the operating element is monitored during operation of the automobile and is redefined upon adequate deviation.

* * * * *